US010261974B2

(12) United States Patent
Wiik et al.

(10) Patent No.: US 10,261,974 B2
(45) Date of Patent: Apr. 16, 2019

(54) TEMPERATURE MODELING CONSTRAINED ON GEOPHYSICAL DATA AND KINEMATIC RESTORATION

(75) Inventors: Torgeir Wiik, Trondheim (NO); Ketil Hokstad, Trondheim (NO); Anders Dræge, Florvåg (NO); Kenneth Duffaut, Trondheim (NO); Christine Fichler, Ranheim (NO); Rune Kyrkjebø, Trondheim (NO)

(73) Assignee: Statoil Petroleum AS, Stavanger (NO)

( * ) Notice: Subject to any disclaimer, the term of this patent is extended or adjusted under 35 U.S.C. 154(b) by 605 days.

(21) Appl. No.: 14/422,401

(22) PCT Filed: Aug. 20, 2012

(86) PCT No.: PCT/EP2012/066178
§ 371 (c)(1),
(2), (4) Date: May 11, 2015

(87) PCT Pub. No.: WO2014/029415
PCT Pub. Date: Feb. 27, 2014

(65) Prior Publication Data
US 2015/0242362 A1    Aug. 27, 2015

(51) Int. Cl.
*G06F 17/50*    (2006.01)
*G06F 17/11*    (2006.01)
*G01V 99/00*    (2009.01)

(52) U.S. Cl.
CPC .............. *G06F 17/11* (2013.01); *G01V 99/00* (2013.01); *G01V 99/005* (2013.01)

(58) Field of Classification Search
CPC ........ G06F 17/11; G01V 99/005; G01V 99/00
(Continued)

(56) References Cited

U.S. PATENT DOCUMENTS 3,807,227 A    4/1974  Smith, Jr.
3,864,969 A    2/1975  Smith, Jr.
(Continued)

FOREIGN PATENT DOCUMENTS

GB    2 165 674    4/1986
WO    2009/137228 A2    11/2009

OTHER PUBLICATIONS

Popov Yu, Pimenov V., Tergychniy W., "Achievements In Geothermic Research Of Oil-Gas Deposits", Oil-Gas Review, Spring 2001, pp. 7-9.
(Continued)

*Primary Examiner* — Dwin M Craig
(74) *Attorney, Agent, or Firm* — Eversheds Sutherland (US) LLP

(57) ABSTRACT

A method is disclosed for the estimation of subsurface temperature distributions from a 3-dimensional heat conductivity model for a geological formation. The method may be characterized by the following steps: (a) obtaining measured data corresponding to a geological subsurface formation of interest including seismic survey data, in-well temperature, seafloor or surface heat flux measurements and laboratory-based measurements of core porosity, (b) estimating a relationship between seismic velocity and heat conductivity, wherein seismic velocity is linearly dependent on porosity and heat conductivity is exponentially or linearly dependent on porosity, and (c) calibrating the model to the measured in-well data and laboratory-based measurements of core porosity.

12 Claims, 4 Drawing Sheets

(58) Field of Classification Search
USPC .............................................................. 703/1
See application file for complete search history.

(56) References Cited

U.S. PATENT DOCUMENTS

| | | |
|---|---|---|
| 4,947,682 A | 8/1990 | Anderson et al. |
| 2008/0086287 A1* | 4/2008 | Xu .................... G01V 99/00 |
| | | 703/2 |
| 2011/0015912 A1 | 1/2011 | Oppert et al. |
| 2011/0208499 A1* | 8/2011 | Verscheure ............ G01V 11/00 |
| | | 703/10 |

OTHER PUBLICATIONS

Ranjana Ghosh, et al.; Title: "Physical Parameters of Hydrated Sediments Estiamted From Marien Seismic Reflection Data", Current Science, vol. 90, No. 10, May 25, 2005, pp. 1421-1430.
Tony Meixner, et al.; Title: "Stochastic Temperatures, Heat Flow and Geothermal Gradient Modeling from a 3D Map of the Cooper Basin Region, Central Australia", SEG Denver 2010 Annual Meeting, 2010, pp. 1100-1106.

* cited by examiner

TEMPERATURE MODELING CONSTRAINED ON GEOPHYSICAL DATA AND KINEMATIC RESTORATION

TECHNICAL FIELD

The present invention relates to temperature modeling constrained on geophysical data and kinematic restoration, and in particular, the present disclosure relates to temperature modeling and the constraining of such models based on seismic velocity analysis, gravity inversion, rock physics, structural geology and numerical mathematics.

BACKGROUND ART

Within the field of exploration geophysics the study of subsurface structures and properties of the earth, and how these properties have evolved over geologic time scales is a main theme.

There are at present several commercial software packages for basin modeling:
PetroMod Software Documentation, Schlumberger
PerMedia Software Documentation, Landmark
Temis Software Documentation, Institut Français du Pétrole (IFP)

The methods implemented in the known commercial software packages are not constrained by geophysical data and rock physics models, and do not apply an update strategy based on mismatch with geophysical observations.

At present there is a lack of modeling tools that take these issues sufficiently into account and especially with the focus on a deeper understanding the evolution of temperatures and temperature gradients on geologic time scales.

SUMMARY OF THE INVENTION

Information regarding temperature, and in particular, the evolution of temperature and temperature flux gradients in a given basin on geologic time scales is a central factor in the determination of whether source rock organic matter has been converted to hydrocarbon.

The present invention has relevance for its applicable in all areas of subsurface modeling and exploration, including oil and gas. Data from measurement methods such as seismic, magnetic and gravity anamolies, well-log temperature, well-core data and others can yield important parameters but at best can only give a partial picture of the true nature of the subsurface geologic properties of interest. And, modeling on its own is highly dependent on the parameters that are used and how well they are understood. By constraining models with measurement data, the models can yield a more accurate kinematic restoration over the geologic time scales for the geological structure of interest.

The term kinematic restoration generally refers to the modeled reconstruction of a geologic structure, preferably by way of a three-dimensional model, which simulates a sequence of intermediate stages between undeformed and deformed states.

In addition data processing and visualization techniques, based on data-constrained models, are highly dependent on the spatial coverage and quality of the input data that is used.

Geological history and past and present temperature distributions is directly linked to present-day geophysical observations in three dimensions.

The present invention addresses fundamental problems in petroleum system evaluation, and goes way beyond presently known commercial software and best practice. The invention will reduce the uncertainty in temperature modeling, by constraining conceptual basin models on geophysical observations.

A first aspect of the present invention relates to a method for the estimation of subsurface temperature distributions from a 3-dimensional heat conductivity model for a geological formation characterized by the following steps:
a). obtain measured data corresponding to a geological subsurface formation of interest comprising seismic survey data, in-well temperature, seafloor or surface heat flux measurements and laboratory-based measurements of core porosity,
b). estimate a relationship between seismic velocity and heat conductivity, wherein seismic velocity is linearly dependent on porosity and heat conductivity is exponentially or linearly dependent on porosity, and
c). calibrate said model to said measured in-well data and laboratory-based measurements of core porosity.

A second aspect of the present invention relates to a method of the first aspect, wherein the, wherein said seismic velocity is estimated by Dix inversion or PSDM (Prestack Depth Migration) velocity analysis or full-waveform inversion.

A third aspect of the present invention relates to a method of the first or second aspect, wherein subsurface temperature distributions are estimated by solving the differential equation from Fourier's Law:

$$q = -k\nabla T$$

where
q is the heat flux vector,
k is the heat conductivity, and $$\nabla T = \left(\frac{\partial T}{\partial x}, \frac{\partial T}{\partial y}, \frac{\partial T}{\partial z}\right)$$

is the temperature gradient.

A fourth aspect of the present invention relates to a method of the third aspect, wherein the boundary conditions for the solution of Fourier's law are based on the following steps:
a) constructing geological scenarios from seismic interpretation, including depth to the Moho,
b) constraining the set of geological scenarios using gravity and magnetic data,
c) computing end-member solutions of Fourier's law assuming a range of cases with constant heat flux, for each case, and
d) calibrating a range of solutions to Fourier's law to in-well temperature measurements and surface or seafloor heat flux measurements, preferably within a Bayesian statistical framework, and
e) computing the equilibrium temperature distribution from a mapping V<=>lq/kl.

A fifth aspect of the present invention relates to a method of the fourth aspect, wherein said temperature distribution is a present-day temperature distribution for use as a final condition in a forward model of the temperature history as a function of geological time.

A sixth aspect of the present invention relates to a method of the fourth aspect, wherein said temperature distribution is a present-day temperature distribution for use as a initial condition in a backward model of the temperature history as a function of geological time.

A seventh aspect of the present invention relates to a method of the fifth or sixth aspect, wherein finite-difference and finite-element solutions are used in heat diffusion equations for heat flow.

An eighth aspect of the present invention relates to a method of the seventh aspect, wherein said heat flow simulations apply the following parameters:
a) heat conduction, including anisotropic heat conductivity,
b) advection, including uplift and subsidence and convection, including fluid flow,
c) external boundary conditions, including measured temperature, temperature gradient or heat flux at the top and base,
d) internal heat generation, including radioactive decay in sediments,
e) transient heat sources, including intrusions, and
f) time-dependent subsurface properties, including known geological history.

A ninth aspect of the present invention relates to a method of the eighth aspect, wherein the modeling of geological temperature history is conducted iteratively comprised of the following steps:
a) proposing end-member and mean cases for a range of geological histories by kinematic restoration, including first-order geological events such as subsidence, uplift, erosion, glaciation, major tectonic events,
b) building corresponding time-dependent property models for heat conductivity, heat capacity and mass density using rock physics models and geophysical data including seismic velocity and gravity,
c) forward modeling, or backward modeling, the temperature history, with a range of boundary conditions including time-dependent heat flux or temperature at top and base,
d) comparing forward modeled temperature and temperature-gradient history to predicted present-day temperature distribution,
e) adjusting said boundary conditions using a measure of misfit to rule out unlikely geological histories, and
f) adjusting said boundary conditions using an automatic inversion procedure to match the present-day temperature distribution.

A tenth aspect of the present invention relates to a method of the ninth aspect, wherein the output from the numerical simulations is comprised of 1D, 2D or 3D temperature history and temperature gradient history.

DETAILED DESCRIPTION OF THE INVENTION

Figure 1:
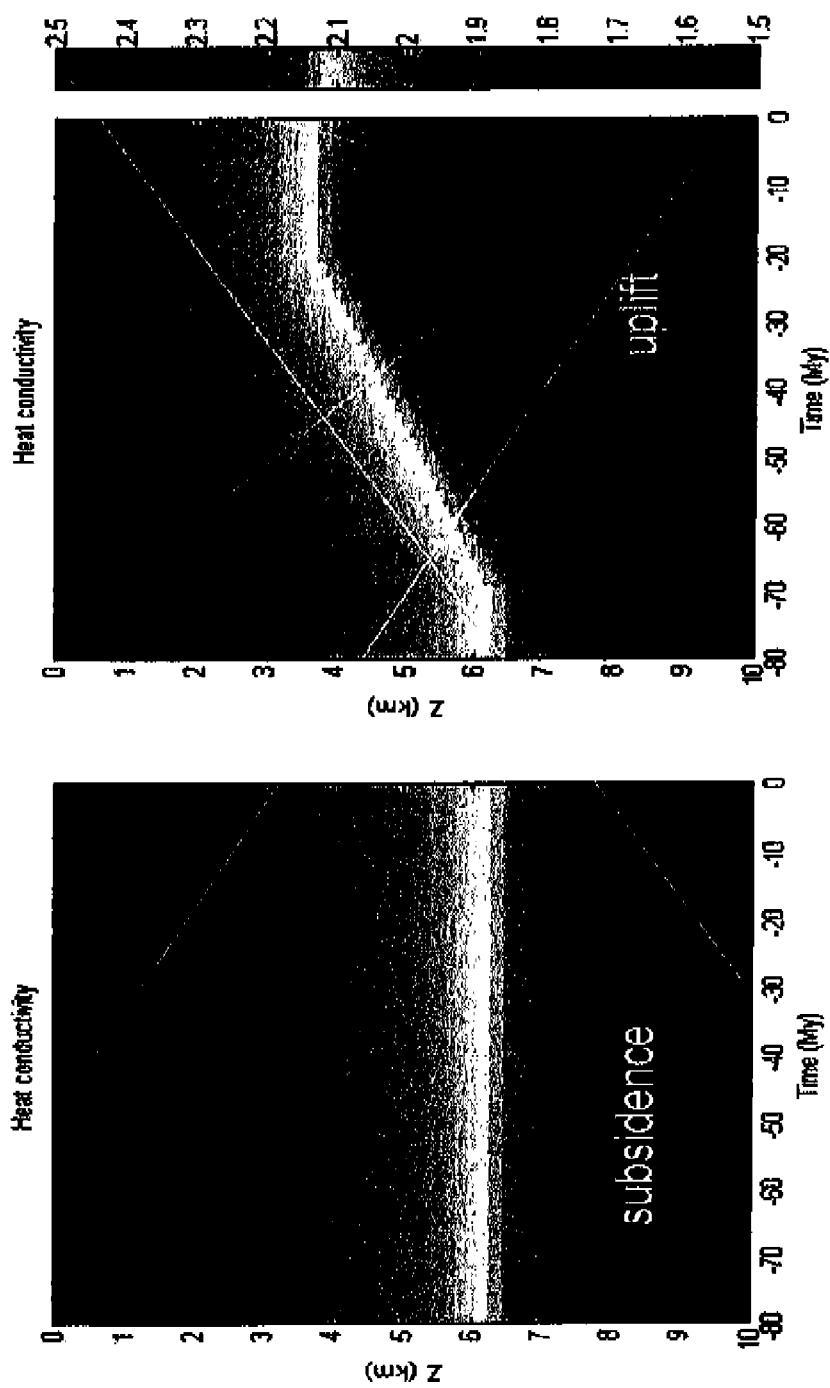
FIG. 1 shows time-dependent geophysical properties linked to geological history.

The combination of the following elements constitute the key features of the invention: seismic velocity analysis, magnetic and gravity inversion, a rock physics model, structural geological models, numerical modeling and electromagnetic data.

The heat flow (diffusion) equation (including advection and convection) is linked to density via gravity, and then linked to seismic velocity via the rock physics model. This results in a relation between heat conductivity and seismic velocity.

Various history scenarios can be included into the modeling. A key element is the extensive use of heat diffusion equations to model temperature history based on geological history and corresponding time-dependent geophysical properties, whereby the model is established explaining the present-day geophysics and temperature observations, including direct temperature measurements in wells and heat flow at the seafloor or surface.

Two key elements of the present invention are as follows:
1). ESTABLISH 3D CUBES OF A PRESENT-DAY SUBSURFACE TEMPERATURE DISTRIBUTION:

Assuming thermal equilibrium, the temperature distribution can be computed by solving the differential equation given by Fourier's law $q=-k \nabla T$, where q is heat flux, k is heat conductivity, and $$\nabla T = \left(\frac{\partial T}{\partial x}, \frac{\partial T}{\partial y}, \frac{\partial T}{\partial z}\right)$$

is the temperature gradient.

A 3D heat conductivity model will be established using rock-physics relations between seismic velocity and heat conductivity. Hence, given seismic interval velocities from Dix inversion, PSDM (Prestack Depth Migration) velocity analysis or full-waveform inversion, a 3D conductivity model can be established and calibrated to well data, comprising direct temperature data, and laboratory measurements on cores for obtaining core porosity.

The generic relation between seismic velocity and heat conductivity is a linear-to-exponential relationship, i.e. velocity is a linear function of porosity, whereas conductivity is an exponential function of porosity. To first order, conductivity can also be approximated by a linear function of porosity. Part of the invention is to refine and calibrate the rock physics models describing this relation.

A major challenge is to establish the boundary conditions for the solution of Fourier's law. This challenge can be addressed as follows:
1. Construct geological scenarios from seismic interpretation, including depth to the Moho (Mohorovičić discontinuity).
2. Constrain the set of geological scenarios using gravity and magnetic data.
3. Compute end-member solutions of Fourier's law assuming a range of cases with constant heat flux (for each case).

A range of solutions to Fourier's law will be calibrated to temperature measurements in wells and surface heat flux measurements. This can naturally be described within a Bayesian statistical framework.

From a mathematical point of view, Fourier's law has the same structure as the Eikonal equation of seismic ray theory $$\left(|\nabla \tau| = \frac{1}{V}\right)$$

for wave propagation, where $\tau$ represents wave travel time and V represents wave velocity. Hence, the equilibrium temperature distribution can be computed by the mapping $V \Leftrightarrow lq/kl$.

2). TIME-DEPENDENT TEMPERATURE MODELING CONSTRAINED BY GEOPHYSICAL OBSERVATIONS AND GEOLOGICAL HISTORY

Using the present-day temperature distribution as final condition (or initial condition), the temperature history is forward modeled (or backward modeled) as a function of geological time.

This will be achieved by finite-difference and finite-element solutions to the diffusion equation for heat flow.

The following time-dependent effects are accounted for in the heat flow simulations:
   a) Heat conduction, including anisotropic heat conductivity.
   b) Advection (uplift, subsidence) and convection (fluid flow).
   c) External boundary conditions (temperature or heat flux at the top and base).
   d) Internal heat generation (radio-active decay in sediments).
   e) Transient heat sources (e.g. intrusions).
   f) Time-dependent subsurface properties (i.e. geological history).

A key element in the modeling of temperature history is reconstruction of geological history.

An iterative approach will be used as follows:

Propose end-member and mean cases for a range of geological histories by kinematic restoration, including first-order geological events (subsidence, uplift, erosion, glaciation, major tectonic events).

Build the corresponding time-dependent property models for heat conductivity, heat capacity and mass density using rock physics models and geophysical data (seismic velocity and gravity).

Forward model (or backward model) the temperature history, with a range of boundary conditions. The boundary conditions are given in terms of temperature, temperature gradients or heat flow at the top and base of the model.

Compare forward modeled temperature and temperature-gradient history to predicted present-day temperature distribution.

Use a measure of misfit from above to adjust boundary condition, or to rule out unlikely geological histories. The adjustment of boundary conditions can be done either as a manual procedure, or as an automatic inversion procedure.

Output from the numerical simulations are 1D, 2D or 3D temperature history and temperature gradient history, directly linked to geological history (including subsidence, uplift, net erosion, and transient events).

FIG. 1. Time-dependent geophysical properties linked to geological history. To first order, the deposition, subsidence and uplift will follow systematic trends controlled by porosity and lithology. Time dependent heat conductivity for subsidence (left) and uplift (right). Typically, heat conductivity, seismic velocity, density and resistivity will carry a "memory" of the maximum depth of burial. The heat flux values near the bottom of the plots correspond to the highest values on the scale, while the heat flux values near the top of the plots correspond to the lowest values on the scale.

Figure 2:
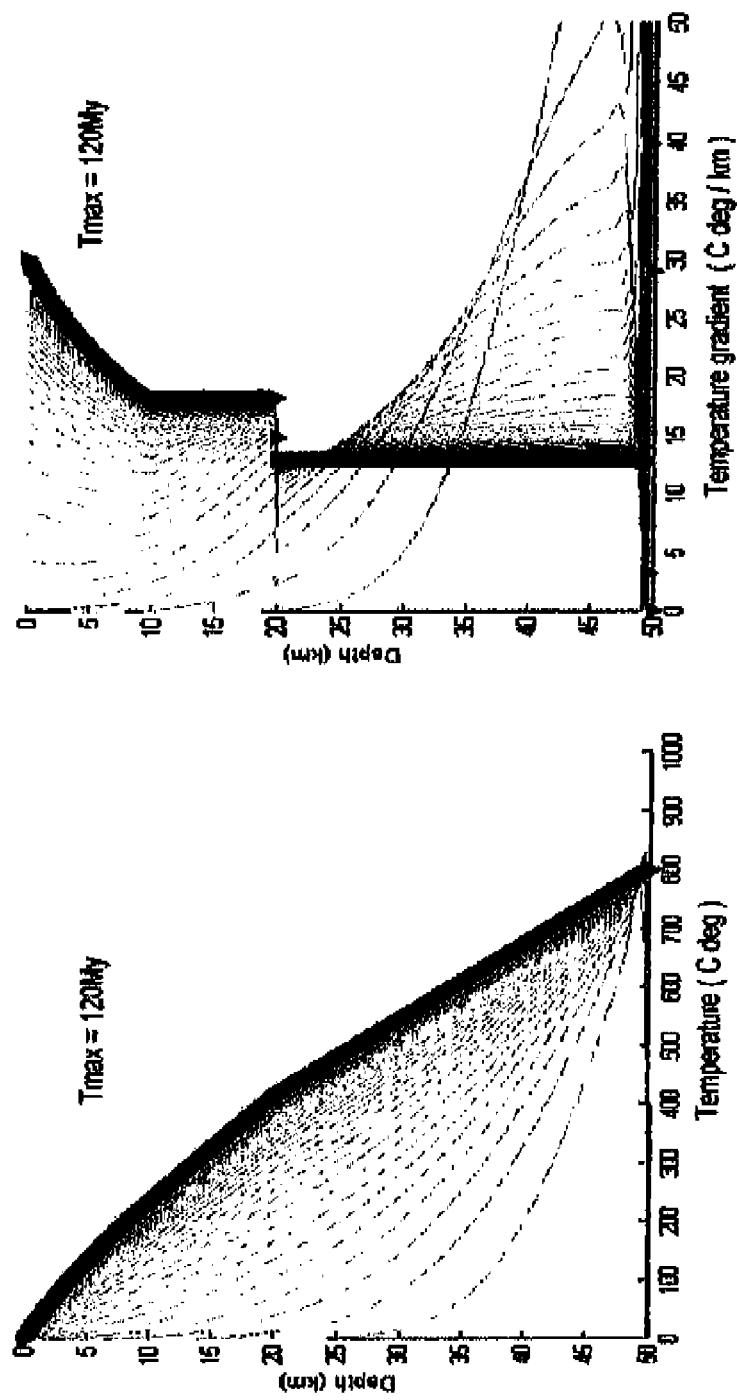
FIG. 2 shows the forward modeled temperature (left) and temperature-gradient history (right) with boundary conditions T=0 deg Celcius at the top and T=800 deg Celcius at the bottom.

FIG. 2: Forward modeled temperature (left) and temperature-gradient history (right) with boundary conditions T=0 deg Celcius at the top and T=800 deg Celcius at the bottom. Computed using a finite difference solution to the time-dependent heat flow equation. Final state (black) and temperature distribution in increments of 10My (thin grey lines).

Figure 3A:
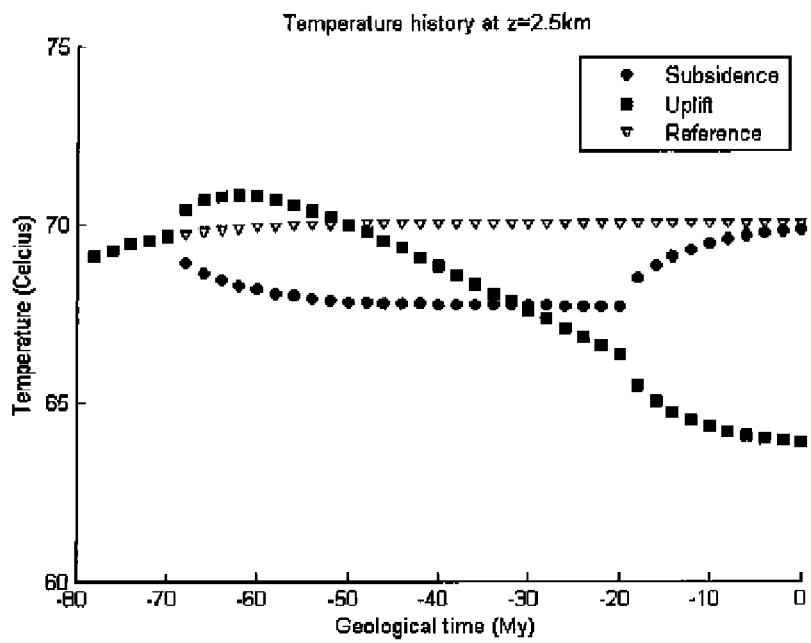
FIG. 3a shows the forward modeled final (present-day) temperature history after 120 million years (My).

FIG. 3a: Forward modeled final (present-day) temperature histories at a depth of 2.5 km after 120My, with subsidence, uplift and "dead" reference.

Figure 3B:
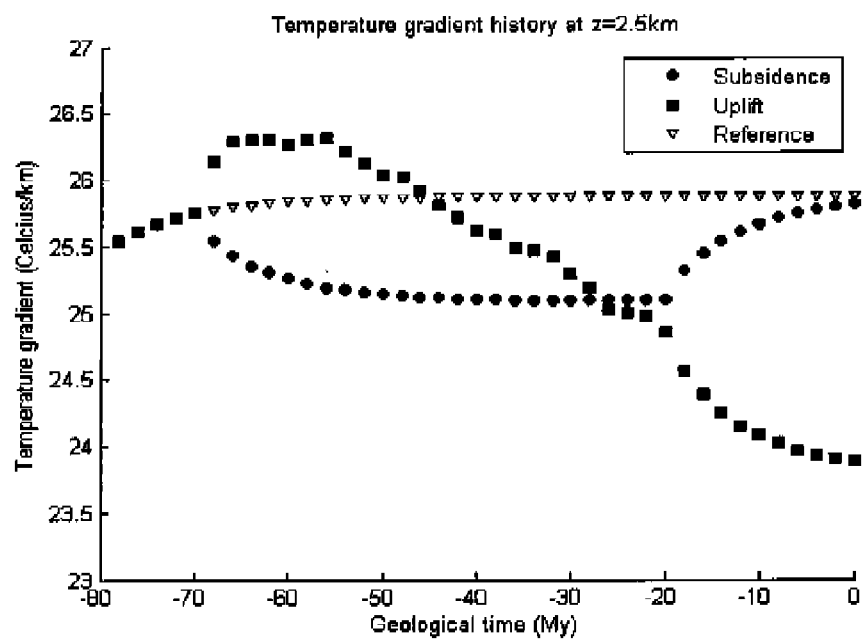
FIG. 3b shows the forward modeled final (present-day) temperature gradient history after 120 million years (My).

FIG. 3b: Forward modeled final (present-day) temperature gradient histories at a depth of 2.5 km after 120My, with subsidence, uplift and "dead" reference.

Figure 4:
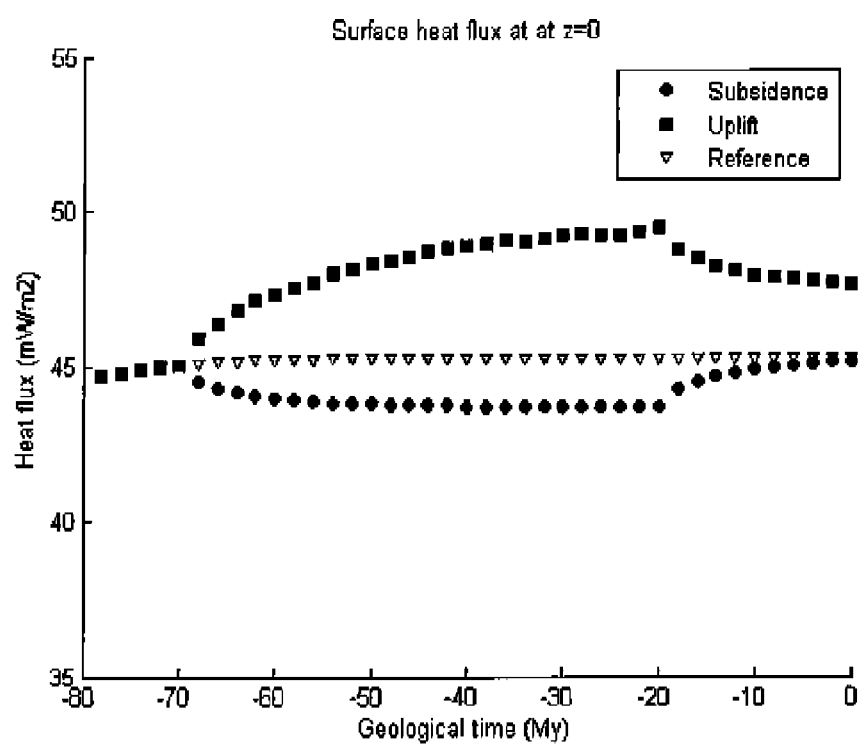
FIG. 4 shows forward modeled heat flux at the surface as a function of geological time, computed from modeled temperature gradient and heat conductivity by Fourier's law.

FIG. 4: Forward modeled heat flux ($mW/m^2$) at the surface as function of geologic time, computed from modeled temperature gradient and heat conductivity by Fourier's law. (1) refers to the moment when subsidence/uplift is turned on, (2) refers to when subsidence/uplift is turned off and (3) refers to a different final state with higher heat flux due to high-conductive rock being moved upwards and younger low-conductive rock being eroded.

In review, the new elements of the workflow are:
The use of measured geophysical observations for constraining the temperature modeling.
The joint constraints from kinematic restoration and geophysical observations.
Calibrated rock physics models linking seismic velocity and density to heat conductivity.
The use of existing seismic ray tracing software to model temperature distributions.
The use of full heat diffusion equations to model temperature history based on geological history and corresponding time-dependent geophysical properties.
Formulation of the temperature history problem in a Bayesian framework.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the scope of the appended claims.

While the invention has been illustrated and described in detail in the drawings and foregoing description, such illustration and description are to be considered illustrative or exemplary and not restrictive and it is not intended to limit the invention to the disclosed embodiments. The mere fact that certain measures are recited in mutually different dependent claims does not indicate that a combination of these measures cannot be used advantageously. Any reference signs in the claims should not be construed as limiting the scope of the invention.

We claim:

1. A method for the estimation of subsurface temperature distributions from a 3-dimensional heat conductivity model for a geological formation comprising the following steps:
   (a) obtain measured data corresponding to a geological subsurface formation of interest comprising: seismic survey data; in-well temperature measurements, or seafloor or surface heat flux measurements; and laboratory-based measurements of core porosity,
   (b) estimate a relationship between seismic velocity and heat conductivity, wherein seismic velocity is linearly dependent on porosity and heat conductivity is exponentially or linearly dependent on porosity,
   (c) calibrate said heat conductivity model to said measured in-well temperature data, or seafloor or surface heat flux data, and said laboratory-based measurements of core porosity;
   (d) using said calibrated heat conductivity model to estimate subsurface temperature distributions; and then (e) using the estimated subsurface temperature distributions to perform exploration for oil and gas.

2. Method according to claim 1, wherein said seismic velocity is estimated by Dix inversion or PSDM (Prestack Depth Migration) velocity analysis or full-waveform inversion.

3. Method according to claim 1, wherein subsurface temperature distributions are estimated by solving the differential equation from Fourier's Law:

$$q = -k\nabla T$$

where
q is the heat flux vector,
k is the heat conductivity, and $$\nabla T = \left(\frac{\partial T}{\partial x}, \frac{\partial T}{\partial y}, \frac{\partial T}{\partial z}\right)$$

is the temperature gradient.

4. Method according to claim 3, wherein the boundary conditions for the solution of Fourier's law are based on the following steps:
 (a) constructing geological scenarios from seismic interpretation, including depth to the Moho,
 (b) constraining the set of geological scenarios using gravity and magnetic data,
 (c) computing end-member solutions of Fourier's law assuming a range of cases with constant heat flux, for each case,
 (d) calibrating a range of solutions to Fourier's law to in-well temperature measurements and surface or seafloor heat flux measurements, preferably within a Bayesian statistical framework, and
 (e) computing the equilibrium temperature distribution from a mapping $V \Leftrightarrow lq/kl$.

5. Method according to claim 4, wherein said temperature distribution is a present-day temperature distribution for use as a final condition in a forward model of the temperature history as a function of geological time.

6. Method according to claim 4, wherein said temperature distribution is a present-day temperature distribution for use as an initial condition in a backward model of the temperature history as a function of geological time.

7. Method according to claim 5, wherein finite-difference and finite-element solutions are used in heat diffusion equations for heat flow.

8. Method according to claim 7, wherein said heat flow simulations apply the following parameters:

(a) heat conduction, including anisotropic heat conductivity,
 (b) advection, including uplift and subsidence and convection, including fluid flow,
 (c) external boundary conditions, including measured temperature, temperature gradient or heat flux at the top and base,
 (d) internal heat generation, including radioactive decay in sediments,
 (e) transient heat sources, including intrusions, and
 (f) time-dependent subsurface properties, including known geological history.

9. Method according to claim 8, wherein the modeling of geological temperature history is conducted iteratively comprised of the following steps:
 (a) proposing end-member and mean cases for a range of geological histories by kinematic restoration, including first-order geological events such as subsidence, uplift, erosion, glaciation, major tectonic events,
 (b) building corresponding time-dependent property models for heat conductivity, heat capacity and mass density using rock physics models and geophysical data including seismic velocity and gravity,
 (c) forward modeling, or backward modeling, the temperature history, with a range of boundary conditions including time-dependent heat flux or temperature at top and base,
 (d) comparing forward modeled temperature and temperature-gradient history to predicted present-day temperature distribution,
 (e) adjusting said boundary conditions using a measure of misfit to rule out unlikely geological histories, and
 (f) adjusting said boundary conditions using an automatic inversion procedure to match the present-day temperature distribution.

10. Method according to claim 9, wherein the output from the numerical simulations is comprised of 1D, 2D or 3D temperature history and temperature gradient history.

11. Method according to claim 1, further comprising measuring seismic survey data, in-well temperature measurements, or seafloor or surface heat flux measurements, and laboratory-based measurements of core porosity.

12. Method according to claim 1, further comprising before step (a) performing a seismic survey to generate seismic survey data, or measuring in-well temperature(s), or seafloor or surface heat flux, to generate measured data.

* * * * *